United States Patent Office 3,740,246
Patented June 19, 1973

3,740,246
PROCESS FOR IMPROVING POLYAMIDE FILMS
Mutsuo Kuga, Tatuo Iwasaki, Kayomon Kyo, and Atsuo Yoshioka, Kyoto, Japan, assignors to Unitika Kabushiki Kaisha, Hyogo-ken, Japan
No Drawing. Filed Jan. 11, 1971, Ser. No. 105,725
Claims priority, application Japan, Jan. 12, 1970, 45/3,386
Int. Cl. B44d 1/32
U.S. Cl. 117—7                                    13 Claims

ABSTRACT OF THE DISCLOSURE

The present invention relates to improved polyamide films formed by the process utilizing a concurrent biaxial drawing technique, followed by heat-setting of the drawn film with simultaneous curing of a resin composition applied to the film surface which is of a heat-setting and hydrophobic nature.

---

The resin-coated polyamide films thus formed have various advantageous features, such as a very even and uniform resin layer bonded firmly to the film base without cracking and/or creasing, which is obtained in a simple manner and with improved efficiencies. The polyamide films produced by the process of the present invention possess improved water proofing, anti-blocking and anti-electrification characteristics, in addition to excellent processability.

Polyamide films produced by concurrent biaxial drawing techniques have superior mechanical and optical properties when compared to those of other resin films such as those of polyethylene terephthalate, polypropyrene etc. The practical uses of biaxially drawn polyamide films (for example, for packaging, printing and the preparation of metallized films and threads) are, however, sometimes more or less restricted due to the inherent defects of polyamide film such as hygroscopic characteristics, high vapor permeability and low-anti-blocking property etc.

Proposed processes for overcoming these defects of biaxially drawn polyamide films include one which involves the formation of a hydrophobic thin layer of a thermoplastic resin on the surface of the film after drawing. It has, however, been shown that when this process is applied to such polyamide films, in particular films prepared by concurrent biaxial drawing techniques, which are classified into the so-called "wide films" (film having a width of more than about one meter), creasing is undesireably encountered because of the low anti-blocking characteristics of biaxially drawn polyamide films. It is also difficult to use conventional coating or laminating devices for this purpose without modification. Avoiding the deteriorative generation of creases has become even more important as the use of the so-called "wide-films" at higher temperatures and with quicker speed is increasingly favored in order to obtain better production efficiencies. In this case, in order to form resin layers on the surface of simultaneously and biaxially drawn polyamide film, care should be payed to the dimensional changes of the film throughout all the process steps prior to completion of drying of the applied resin. Sometimes the use of starting films having particular low heat-shrinkage values is also required.

When compared with coating layers composed of thermosetting resins, coating layers composed of thermoplastic resin have the disadvantages of inferior heat-stability, adhesion strength and resistance to chemicals. Polyamide films coated with thermoplastic resins can give rise to various difficulties such as the softening, melting and thermal decomposition of the resin in the course of drawing or heat-setting of the film. Furthermore, there are additional difficulties in the course of subsequent processing such as metallizing, coating and laminating treatments.

If biaxially drawn polyamide films coated with thermosetting resins could be obtained, it would be possible to obtain various advantageous results such as improved physical properties with higher efficiencies.

It has now unexpectedly found that polyamide films coated with thermosetting resins can be obtained by concurrent biaxial drawing technique. The present invention provides a process for improving properties of polyamide films by means of a concurrent biaxial drawing, followed by heat-setting of the drawn film. Polyamide films produced according to the process of the present invention possess improved water proofing and anti-blocking characteristics, low friction coefficient, low vapor permeability, improved adhesion to the resin coating layer and various other advantages and can be produced in simple manner and with improved efficiencies and without generation of creases.

Another object of the present invention is to provide simultaneously and biaxially drawn polyamide films having a hydrophobic resin coating layer on at least one surface, which is very even and uniform and is bonded firmly to the film base.

The present invention is additionally directed to the provision of laminated or coated film structures and metallized films, both comprising one or more polyamide films coated with a heat-setting resin of a hydrophobic nature produced by the process of the present invention. Other objects and features will be apparent upon reading the following specification and claims.

According to the present invention, there is provided a process for improving the properties of polyamide films by means of a concurrent biaxial drawing technique wherein a polyamide film is simultaneously drawn in the longitudinal and transverse directions at a temperature of from 70° C. to 180° C. which is at least 35° C. below the melting point of the film, the ratio of the draw speed in the longitudinal direction to that in the transverse direction being from 0.5:1 to 2.0:1, and the ratio of the thickness of the drawn film to that of the film prior to drawing being from 0.25:1 to 0.05:1, wherein at least one surface of the film prior to drawing is coated with a resin composition of a thermosetting and hydrophobic nature, capable of curing at a temperature within the range of from 5° C. to 50° C. below the melting point of the film. The film after drawing is successively heat-set at a temperature within the range of from 5° C. to 50° C. below the melting point of the film so as to effect the simultaneous curing of the applied resin composition.

Polyamide films which may be used for the purpose of the present invention comprises poly-ε-caproamide, poly-hexamethylene adipamide, poly-hexamethylene sebacamide, poly-11-amino-undecanamide, copolymerized polyamides thereof and a mixture thereof.

A preferred process for simultaneous and biaxial drawing the polyamide films according to the present invention is disclosed in British patent specification No. 1,110,623 and U.S. Pat. No. 3,5002,766 (and its patent application) which are hereby incorporated by reference, and made a part of the present disclosure. Biaxial and concurrent drawing of polyamide films can preferably be carried out by using grippers which grip the both sides of the film passed through a divergent film track for drawing, but it is also possible to use the so-called inflation methods using, for example, a mandrel which is heated to a suitable temperature and which is provided with a predetermined curved surface for carrying out the concurrent biaxial drawing of the film.

According to the process of the present invention, applied to the film prior to drawing is a thermosetting resin composition of a hydrophobic nature. Various resin compositions may be used for the process of the present invention, so long as they are of a thermosetting and hydrophobic nature and are capable of being cured at a temperature within the range of from 5° C. to 50° C. below the melting point of the polyamide film within a suitable period of time, e.g., 5 to 40, preferably 10 to 30 seconds. Preferable resin compositions include, for example, those comprising an amino-alkyl resin, amino-acryl resin and/or urethane resin, although it is also possible to use for the present process various other thermosetting resins exemplified as follows: phenol-type resins, amino-type resins, acryl-type resins, alkyd-type resins, epoxy-type resins, polyvinyl-acetal-type resins, etc.

Amino-alkyd resin compositions are usually in the form of a mixture of an alkyd resin, melamine resin and/or urea resin, all of which are of known types. If desired, for example, nitrocellulose may be added to the amino-alkyd resin composition for adjusting the viscosity. In use, the resin composition is dissolved in a suitable organic solvent.

It is also possible to use the resin composition in the form of an aqueous solution or an aqueous emulsion.

Amino-acryl resin compositions are usually in the form of a mixture of acryl-resin, melamine resin and/or urea resin, all of which are of the known types. In use, the amino-acryl resin composition is made up to an aqueous solution or an aqueous emulsion. But it is also preferred to use the resin composition dissolved in a suitable organic solvent.

Urethane resin compositions are usually prepared by mixing a resin having at least two hydroxy groups in its molecular structure (for example, polyesters obtained from ethylene glycol and/or propylene glycol with adipic acid by polycondensation; and copolymers obtained by partial saponification of vinyl acetate and vinyl chloride copolymers) and another resin having at least two isocyanate groups in its molecular structure. Preferred resins of this type are exemplified by one produced by the reaction of 1,6-hexamethylene glycol (one mol) and 2,4-tolylene diisocyanate (two mols) or another produced by the reaction of 1,1,1-trimethylol propane (one mol) and 2,4-tolylene diisocyanate (three mols). It is also possible to use one having isocyanate groups only. In use, the urethane resin composition is dissolved in a suitable organic solvent.

If desired, various additives such as, for example, those conventionally used for improving antiblocking characteristics, preventing anti-electrification and adjusting the viscosity (e.g. nitrocellulose), those for accelerating the drying and curing of the resin (e.g. cobalt stearate, cobalt naphthenate etc.) may be added to the resin composition. However, an excessive amount of such additives is liable to have a deterioratiive influence upon the adhesive strength of the resin layer so that it is preferred to use additives in total amount of not more than 10% by weight of the resin composition (as solids).

The proportion of the ingredients in the resin composition may vary depending upon the desired properties of the resultant film and resin layer as well as upon various drawing conditions such as, for example, draw and heat-set temperature, draw speeds, draw ratio, throughput speed of the film etc.

In all events, it is necessary that the resin composition not be cured at least at the earlier stages of drawing wherein the deformation of the drawn film is substantially effected. Better results can be obtained by sorption of water, if possible, onto the undrawn film in an amount of from 2–12% by weight of the film prior to applying the resin composition. The amount of water may vary with the properties of the film as well as with the drawing conditions etc. It has been shown that under suitable conditions curing is not effected in the drawing zone even when the draw temperature more or less overlaps the range of the heat-set temperature.

The resin composition is applied to the film surface in a suitable manner for example by dipping, coating such as photograveure coating and reverse coating, or spraying to obtain a uniform application. The thickness of the cured resin layer of not more than about one micron is sufficient for general purposes. Normally, sufficient resin is applied to obtain an ultimate coating of 0.01 to 0.5, preferably 0.05 to 0.2 micron. In use, suitable concentration and composition of the resinous agent used can easily be determined by simple tests using specimens having different concentrations and proportions of the ingredients.

After drawing, the film is heat-set in a throughput process at a temperature within the range of from 5° C. to 50° C. below the melting point of the film, whereby the curing is effected simultaneously. An excessively long heat-setting time can give rise to various difficulties such as the heat-deterioration of the film base and the resin layer, in addition to requirement for film passageway of an inordinate length. It is therefore preferred to heat-set the film for about 5 to 40 seconds. By means of concurrent drawing according to the process of the present invention, the resin composition prior to curing expands rapidly and concurrently in the longitudinal and transverse directions to form a very uniform and even layer on the whole surface areas. It has been confirmed that the generation of creases or cracking is not observed on the resin layer after being cured. This contrasts to the inferior formation of the resin layer, and cracking trouble, often observed in the course of conventional processes such as, for example, the so-called two-step biaxial drawing accompanying the resin treatment performed either during or prior to the drawing.

With respect to the simultaneous heat-setting and curing, the heat-setting is preferably carried out under relaxation of not more than 10% in the longitudinal and/or transverse directions, although it is also possible to carry out the heat-setting under tension to keep the longitudinal and transverse dimensions substantially constant.

Resin-coated films obtained by the process of the present invention have various advantages and contribute to expanding the use of drawn polyamide films produced by means of concurrent biaxial drawing technique to various purposes such as, for example, printing, packaging, preparation of metallized films, laminated films for foodstuffs, etc. It is also possible to use two or more sheets of the resin-coated films for laminating purpose. Examples of the advantages achieved by resin-coated films of the present invention are as follows:

(a) Freedom from the generation of creases (b) Even and uniform resin layer having no cracking difficulty particularly when compared with similar films obtained by two-step biaxial drawing (c) Possibility of preparing improved metallized or laminated films (d) Uniform and firm bonding of the layer and base (e) Improved water proof property and vapor impermeability, high anti-blocking and anti-electrification characteristics and low friction coefficient (f) High efficiencies in operation According to the process of the present invention, it is possible to significantly simplify the entire operational steps when compared with conventional coating processes, specifically with those combined with the so-called two-step biaxial drawing techniques. This is true since various supplemental operations such as, for example, winding, re-winding and trimming of the treated film are required for these conventional techniques, regardless of whether the resinous material is applied either before or during the drawing step.

Furthermore, due to the concurrent biaxial drawing of the film at high speed, the resinous material applied on the surface expands rapidly and uniformly throughout the whole surface area thereby giving an unexpectedly uniform and thin resin coating without the cracking and crease difficulties.

The following non-limitative examples illustrate the invention. In the examples, percentage is indicated by weight.

EXAMPLE 1

Poly-ε-caproamide chips (relative viscosity: 2.9 measured at 20° C. in 96% sulfuric acid) were extruded on a cooling roller with an extruding speed of 15 m./min. by conventional T-die process to obtain a substantial amorphous poly-epsilon-caproamide film having a thickness of 240μ. Separately, a solution of amino-alkyd resin preparation containing 63% of Phthalkyd M641–50 (safflower oil-modified alkyd resin preparation containing 37% by weight of anhydrous phthalic acid and having an oil length of 40 and an acid value of not more than 7, commercial product available from Hitachi Kasei Kogyo K.K., Japan), 27% of Melan 20 (butyl-ether-type melamine resin preparation having an acid value of not more than 0.5, commercial product available from Hitachi Kasei Kogyo K.K., Japan) and 10% of nitrocellulose was diluted with a solvent mixture containing toluene, ethyl acetate and cyclohexanon (6:2:2 by weight) to give a concentration of 15% and a viscosity of 60 c.p.s. at 20° C. The curing time was adjusted to 30 seconds at 170° C. The thus-prepared solution was coated on one surface of the poly-epsilon-caproamide film in an amount of 6.5 g./m.$^2$ by means of a conventional photogravure coater (175 meshes).

The film was then simultaneously and biaxially drawn by means of a plurality of gripping means gripping the both sides of the film which was passed through a drawing zone maintained at 150° C. by hot air. The drawing was effected simultaneously in the longitudinal and transverse directions with a draw magnification of 3×3 and at a ratio of draw speeds in the longitudinal and transverse directions of about 1.0 with simultaneous discharging of the vaporized solvent.

The film gripped by the grippers was continuously passed through a heat-setting zone with a throughput speed of 45 m./min. for 26 seconds under a tension to keep the longitudinal and transverse dimensions constant. The atmosphere in the heat-setting zone was kept at 210° C. by hot air. The film was then air-cooled by passing through a cooling zone maintained at ambient temperature. The thus-prepared film had a thickness of 25μ and was coated with a thin layer of amino-alkyd resin having a thickness of from 0.1 to 0.07μ throughout the whole areas of the film. No cracking was found on the coating layer.

EXAMPLE 2

A poly-ε-caproamide film coated with an amino-alkyd resin was prepared in an analogous manner to that described in Example 1, whose same surface was then metallized with aluminum metal (purity: 99.9%) in vacuo ($10^{-3}$–$10^{-4}$ mm. Hg) with a passing speed of 100–120 m./min. in conventional manner to give a thickness of the metal layer of 130 to 150 A. An amino-alkyd resin solution prepared separately in an analogus manner to that described in Example 1 (32% solids) was coated on the surface of the metal layer by means of a conventional photogravure coater (160 meshes). The coated amount of the resin was 7 g./m.$^2$. The coated preparate was cured by using infra-red heaters at about 170° C. for 35 seconds to give a thickness of about 2μ. After this, the coated film was divided into silver threads by means of a conventional microslitter. The silver threads (width: 0.275 mm.) were dipped in boiling water for 60 minutes. Separation of the aluminium layers from the metallized threads was not found. The appearance of the threads was not changed even when they were dipped into an aqueous solution of marseilles soap (0.5%) at 70° C. for 20 minutes or into benzine or trichloroethylene at 20° C. for 30 minutes respectively.

For comparison purpose, control threads were prepared in an analogous manner to that described above without the resin-coating. After dipping the control threads into boiling water for 10 minutes, separation of the aluminum fractions was observed. By dipping into an aqueous solution of marseilles soap (0.5% at 70° C. for 20 minutes, the aluminum fractions were completely separated.

EXAMPLE 3

A substantially amorphous film (thickness: 150μ) of poly-ε-caproamide was prepared in an analogous manner to that described in Example 1 except using an extruding speed of 20 m./min. Separately, an amino-acryl resin preparation containing 40% of Hitaloid 2405 (acryl resin preparation, commercial product available from Hitachi Kasei Kogyo K.K., Japan) 30% of Hitaloid 2606 (acryl resin preparation, commercial product available from the same) and 30% of Melan 11 (butylether-type urea resin preparate having an acid value of not more than 2, commercial product available from the same) was dissolved in a solvent mixture of toluene, xylene and n-butanol (1:1:1 by weight) to give a concentration of 10% and a viscosity of 50 c.p.s. at 20° C. The curing time of the resin preparate was adjusted to 30 seconds at 170° C. The amino-acryl resin preparate was coated on one surface of the undrawn film in an amount of 7 g./m.$^2$ by means of a conventional photogravure coater (175 meshes).

The film was then simultaneously and biaxially drawn in a similar manner to that described in Example 1 with the exception of using a draw temperature of 130° C., draw magnification of 3 in the longitudinal direction and 3.3 in the transverse direction, and a ratio of draw speeds of about 0.9. The drawn film was continuously heat-set in an analogous manner to that described in Example 1 with the exception of using a heat-setting temperature of 205° C., a throughput speed of 60 m./min. and a duration of 20 seconds. In the course of the heat-setting the film a relaxation of 3% in the transverse direction was used. The resin was simultaneously cured in the heat-setting zone.

The film obtained had a thickness of 15μ. The resin layer was very thin and uniform (thickness: 0.08–0.05μ) and no cracking and crease were found on the whole surface areas. The fact that the thus-obtained resin-coated film is very suitable for preparation of golden and silver threads was confirmed by the following physical data (measured at 20° C. at 65% relative humidity):

| Direction | Strength, kg./cm.$^2$ | Elongation, percent |
| --- | --- | --- |
| Longitudinal | 1.8–2.0×10$^3$ | 90–95 |
| Transverse | 2.2–2.4×10$^3$ | 80–85 |

EXAMPLE 4

A poly-ε-caproamide film coated with an amino-acryl resin on one surface was prepared in an analogous manner to that described in Example 3. The resin-coated surface was metallized with aluminum metal in analogous manner to that described in Example 2. To the metallized surface was then applied GR-6 (a rubber-type adhesive preparate, commercial product available from Konishi Gisuke Shoten, Japan) by means of a conventional photogravure coater (145 meshes). After drying, the thickness of the adhesive layer was about 1.5μ. The metallized surfaces of two specimens were adhered with each other at a temperature of 120° C. under a pressure of 200 kg./cm.$^2$. A conventional micro-slitter was used to divide the laminated material into a plurality of threads, each having a width of 0.275 mm. A woven fabric was prepared by using the thus-obtained threads (70 filaments/2.54 cm.) as wefts and nylon 6 filament (30 deniers/7 filaments, 100 filaments/2.54 cm.) as warps. The thus-obtained fabric was readily dyed by various acid dyestuffs, could be printed to give optional colors and figures, and had a soft feeling and an attractive metallic luster.

EXAMPLE 5

A film of polyhexamethylene adipamide (thickness: 240μ) was prepared in an analogous manner to that described in Example 1 with the exception of using polyhexamethylene adipamide (relative viscosity: 2.8 measured at 20° C. in 96% sulfuric acid). Separately, an urethane resin preparation containing Coronate HL (preparation of a reaction product of hexamethylene diisocyanate and 1,1,1-trimethylol propane; NCO group content: 12.4% by weight, commercial product available from Nippon Polyurethane K.K., Japan) and Desmophen 800 (polyol preparation, commercial product available from the same) in such a proportion that the mol ratio of the isocyanate group to the hydroxy group was 1.2:1. The coated amount of the resin was 5.5 g./m.$^2$. The mixture was diluted with ethyl acetate to give a concentration of 18%. It was then applied to one surface of the film by means of a conventional photogravure coater (200 meshes).

The film was then drawn and heat-set in an analogous manner to that described in Example 1 with the exception that the heat-setting was effected at a temperature of 230° C. without relaxation. The thus-obtained film had a thickness of 25μ and was coated with a resin layer on one surface, which was very thin (thickness: 0.11–0.09μ) and uniform. The fact that thus obtained resin-coated film had excellent properties for preparation of golden and silver threads was confirmed by the following physical data measured at 20°C. in 65% relative humidity:

| Direction | Strength, kg./cm.$^2$ | Elongation, percent |
|---|---|---|
| Longitudinal | 2.3–2.5×10$^3$ | 95–100 |
| Transverse | 2.3–2.5×10$^3$ | 95–100 |

EXAMPLE 6

A polyhexamethylene adipamide film coated with an urethane resin on one side was prepared in an analogous manner to that described in Example 5. The resin-coated surface was then metallized with tin metal (purity: 99.9%) in vacuo with a feeding speed of 70–100 m./min. in conventional manner. The thickness of the tin coating was 140–170 A. Separately, an amino-alkyd resin solution (32%) prepared in a similar manner to that described in Example 1 and combined with an aqueous solution containing 4% of a mixture of Neozapon Yellow GR and Neozapon Red GE (commercial dyestuffs available from Badische Anilin Sodafabrik, Germany) was applied at a weight ratio of 5:1. A conventional photogravurecoater (160 meshes) was used for application of the combined solution on the both surfaces of the metallized film.

The thus-applied solution was dried and cured by heating at about 170° C. for 35 seconds by means of infrared heaters, and the film was then divided by means of a conventional microslitter to give golden threads (width: 0.275 mm.). Physical properties of the golden threads obtained were determined in an analogous manner to that described in Example 2 to confirm the fact that the product was quite suitable for practical uses.

EXAMPLE 7

A substantially amorphous film of polyhexamethylene adipamide was prepared in a similar manner to that described in Example 1 except an extruding speed of 20 m./min., which was then dipped with a layer of 3 g./m.$^2$ on one surface of the film at ambient temperature for about 1 second into a water-soluble amino-acryl resin preparation having the following composition:

Composition of the resin preparation (percent by weight)

U-1 (water soluble acryl resin preparation, commercial product available from Dai Nippon Inki K.K., Japan) _____ 15
U-ramin T-34 (water-soluble melamine resin preparation commercial product available from Mitsui Toatsu K.K., Japan) _____ 15
Water _____ 70

After this, a conventional air-knife was used for making the applied solution uniform. The film was drawn in a similar manner to that described in Example 1 with the exception of using a draw magnification in the longitudinal direction of about 3 and that in the transverse direction of 3.3 and a ratio of draw speeds of 0.9. The drawn film was continuously heat-set with simultaneous curing a similar manner to that described in Example 1 with the exception that the heat-setting was effected at a temperature of 230° C. with a throughput speed of 60 m./min. for 20 seconds. The film was subsequently treated in a similar manner to that described in Example 1 to obtain a drawn film (thickness: 15μ) coated with aminoacryl resin having very even and uniform thickness (0.07–0.11μ) and being firmly bonded with the film base. The maximum friction coefficient as measured in a similar manner to that described in ASTM D–1894, was 0.6, while a control film which had been prepared in a similar manner to that described above without the resin-coating exhibited a corresponding value of 3.4.

Z-17 (polyamide-type printing ink, commercial product available from Toyo Ink K.K., Japan) and CVL (urethane-type printing ink, commercial product available from Dai Nippon Ink K.K., Japan) were used for printing test. A piece of Cellotape (pressure-sensitive adhesive tape, commercial product available from Nichiban K.K., Japan) was applied to the resin-coated surface, on which some printings had previously been made by using these inks. The adhesive tape was then peeled off from the surface, but printed ink was not peeled therefrom. When the resin-coated surface having said inks applied to it was dipped into boiling water for 30 minutes, the inks were still not peeled off from the coated surface by the adhesive tape test. In contrast, 80% of Z-17 ink and 40% of CVL ink were peeled off from the surface of the control by the adhesive tape test at 20° C., and 100% of Z-17 and 10% of CVL were peeled off after the treatment with boiling water followed by the adhesive tape test. Separately, a sheet of the resin-coated film was laminated with a polyethylene layer (density: 0.925; thickness: 40μ) by conventional extrusion method. The adhesion of the polyethylene layer to the polyamide film was 430 g./15 mm. width measured at 20° C. at 65% relative humidity, which decreased to 370 g./15 mm. width after treating in boiling water for 30 minutes. On the other hand, the adhesion of the laminated sheets of the control film was 40 g./15 mm. width, and delamination was found after treatment in boiling water for 30 minutes.

A resin-coated poly-hexamethylene adipamide film was produced in a similar manner to that described in this example. Separately, Ex 5701 (commercial product of polyvinylidene chloride preparation available from Asahi-Dow Chemical K.K., Japan) was dissolved in a mixture of ethyl acetate and toluene (1:1 by weight) to give a concentration of 20% by weight. The combined mixtures were applied to the resin-coated surface of the film by means of a conventional photogravure coater (40 meshes). The applied film was dried at 130° C. for 20 seconds by blowing hot air. The thickness of the combined layers after being dried was about 2.5μ. Onto the layer of vinylidene chloride, there was further laminated a polyethylene layer (thickness: 40μ; density: 0.925) by means of a conventional extrusion method. When the thus-obtained laminated product was dipped into boiling water for 30 minutes, there was not observed any harmful influence upon the transparency of the polyvinylidene chloride layer. The thus-treated laminated product had a small oxygen permeability [9 cc. (STP)/m.²/24 hr./atom] which confirmed that the obtained laminated product was a very suitable material for packaging of foodstuffs. For comparison purpose, a control product was prepared in a similar manner to that described above except the absence of the coating of the amino-acryl resin. Whitish turbidity was found on the layer of polyvinylidene chloride by dipping into boiling water. It also had a larger oxygen permeability [13 cc. (STP/m.²/24 hr./atom].

EXAMPLE 8

Poly-ε-caproamide chips (relative viscosity: 3.5 measured at 20° C. in 96% sulfuric acid) were extruded by means of a conventional extruder provided with a circular die with an extruding speed of 5 m./min. and was cooled in nitrogen atmosphere at ambient temperature to obtain a cylindrical film (thickness: 135μ; diameter: 200 mm.). A water-soluble amino-acryl resin preparation prepared in a similar manner to that described in Example 7 was sprayed on the outer surface of the cylindrical film in an amount of 3 g./m.² which was passed through a drawing zone maintained at 130° C. to carry out a concurrent biaxial drawing by air pressure. The draw magnifications in the longitudinal and transverse directions was each 3 and the ratio of draw speeds was about 1.0. The film which had passed through the drawing zone with a passing speed of 15 m./min. still maintained its cylindrical shape and was successively heat-set at 210° C. for 10 seconds. After being cooled both edges of the film were trimmed to obtain a resin-coated drawn film.

The thus-obtained film was free from the generation of creases. In comparison with a control film prepared in a similar manner to that described above without the resin-coating, the coated film had superior anti-blocking characteristics and processability. Golden and silver threads as well as polyethylene-laminated sheets which were prepared in a similar manner to that described in Examples 2, 4, 6, and 7 were also stable after being treated in boiling water.

Having described the present invention, that which is sought to be protected is set forth in the following claims.

What is claimed is:

1. A process for producing drawn polyamide films having improved properties which comprises applying a thermosetting hydrophobic resin composition having a cure temperature below the melting point of the polyamide film as coating layer on at least one surface of a polyamide film prior to drawing, drawing the film simultaneously and biaxially in the longitudinal and transverse directions, and subsequently heat-setting the drawn film at a temperature below the melting point of the film, said resin composition being capable of being cured at the heat-set temperature of the polyamide film.

2. A process according to claim 1, in which the resin composition comprises a member of the group consisting of amino-alkyd resins, amino-acryl resins, urethane resins and mixtures thereof.

3. A process according to claim 1, in which the resin composition is applied to the film surface by dipping.

4. A process according to claim 1 in which the resin composition is applied to the film surface by coating.

5. A process according to claim 1 in which the resin composition is applied to the film surface by spraying.

6. A process according to claim 1, in which the resin is applied by photogravure coating.

7. A process according to claim 1 in which the resin composition is applied so as to give a thickness of the cured resin layer on the surface of the film of not more than 1 micron.

8. A process according to claim 1, in which the heat-setting is effected for 5–40 seconds.

9. A process according to claim 2, in which the amino-alkyd resin composition comprises a mixture of an alkyd resin with a member of the group consisting of melamine resins and, urea resins.

10. A process according to claim 2, in which the amino-acryl resin composition in a mixture of an acryl resin with a member of the group consisting of a melamine resin and an urea resin.

11. A process according to claim 2, in which the urethane resin composition comprises a resin having at least two hydroxy groups in its molecular structure and another resin having at least two isocyanate groups in its molecular structure.

12. The process of claim 1, wherein the film is treated with water so that 2 to 12% by weight of water based on film is absorbed prior to application of the resin coating.

13. A process of claim 1, in which the resin composition is capable of being cured at a temperature within the range of from 5° C. to 50° C. below the melting point of the film.

References Cited

UNITED STATES PATENTS

| | | | |
|---|---|---|---|
| 2,973,287 | 2/1961 | McBride | 117—138.8 F |
| 2,976,185 | 3/1961 | McBride | 117—138.8 F |
| 3,502,766 | 3/1970 | Tsuruta et al. | 264—289 |

WILLIAM D. MARTIN, Primary Examiner

T. G. DAVIS, Assistant Examiner

U.S. Cl. X.R.

117—47 A, 104 R, 138.8 N, 161 K, 161 LN